United States Patent
Zhu

(10) Patent No.: US 11,329,784 B2
(45) Date of Patent: May 10, 2022

(54) METHOD AND DEVICE FOR REALIZING SIGNALING DETECTION, USER EQUIPMENT, AND BASE STATION

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 31 days.

(21) Appl. No.: 16/642,332

(22) PCT Filed: Sep. 7, 2017

(86) PCT No.: PCT/CN2017/100886
§ 371 (c)(1),
(2) Date: Feb. 26, 2020

(87) PCT Pub. No.: WO2019/047097
PCT Pub. Date: Mar. 14, 2019

(65) Prior Publication Data
US 2021/0083829 A1    Mar. 18, 2021

(51) Int. Cl.
*H04L 5/00*    (2006.01)
*H04W 72/04*    (2009.01)
*H04W 74/00*    (2009.01)

(52) U.S. Cl.
CPC ......... *H04L 5/0053* (2013.01); *H04W 72/044* (2013.01); *H04W 72/048* (2013.01); *H04W 74/004* (2013.01); *H04W 74/008* (2013.01)

(58) Field of Classification Search
None
See application file for complete search history.

(56) References Cited

U.S. PATENT DOCUMENTS

| 2017/0150355 | A1 | 5/2017 | Bergius et al. |
| 2019/0274117 | A1* | 9/2019 | Zhang .................. H04W 74/00 |
| 2019/0349910 | A1* | 11/2019 | Ma ....................... H04L 1/0038 |

(Continued)

FOREIGN PATENT DOCUMENTS

| CN | 102056185 A | 5/2011 |
| CN | 102348189 A | 2/2012 |
| CN | 102572915 A | 7/2012 |

(Continued)

OTHER PUBLICATIONS

Other Control Channels for E-PDCCH, 3GPP TSG RAN WG1 Meeting #69, R1-122724, May 25, 2012 (May 25, 2012), entire document.

(Continued)

*Primary Examiner* — Mohammad S Adhami
(74) *Attorney, Agent, or Firm* — Syncoda LLC; Feng Ma

(57) ABSTRACT

A method for implementing signaling detection includes: information for identifying a detection capability is determined based on a signaling detection capability supported by UE; and the information for identifying a detection capability is reported to a base station. Therefore, the UE can report the information for identifying a detection capability to the base station to enable the base station to configure a detection control parameter based on the signaling detection capability of the UE, such that success rate of signaling detection and the detection efficiency of the UE can be improved.

15 Claims, 13 Drawing Sheets

Information for identifying a detection capability reported by UE is received — 501

A signaling detection capability of the UE is determined based on the information for identifying a detection capability of the UE — 502

(56) References Cited

U.S. PATENT DOCUMENTS

2020/0178344 A1    6/2020    Shan et al.

FOREIGN PATENT DOCUMENTS

| CN | 103581236 A | 2/2014 |
| CN | 103731322 A | 4/2014 |
| CN | 106465108 A | 2/2017 |
| EP | 3657887 A1 | 5/2020 |

OTHER PUBLICATIONS

Coordination of Band Combinations in IRAT DC, 3GPP TSG-RAN WG2 NR Ad Hoc, R2-1700129, Jan. 19, 2017 (Jan. 19, 2017), entire document.

Performance Requirements for HS-DPCCH Signaling Detection, 3GPP TSG-RAN Working Group 4 (Radio) Meeting #30, R4-040166, Feb. 16, 2004 (Feb. 16, 2004), entire document.

"3GPP; Technical Specification Group Radio Access Network; Evolved Universal Te rrestrial Radio Access (E-UTRA); Radio Resource Control (RRC); Protocol specification (Release 14)", 3GPP Standard; Technical Specification; 3GPP TS 36.331, 3GPP, Mobile Competence Centre; 650, Route Des Lucioles; F-06921 Sophia-Antipolis Cedex; France, vol. RAN WG2, No. V14.3.0, Jul. 13, 2017 (Jul. 13, 2017), pp. 1-745, XP051336663, paragraph 5.6.3, Figure 5.6.3.1-1, p. 247-p. 248, p. 506-p. 545.

Guangdong Oppo Mobile Telecom: "NR 4-Step Random Access Procedure", 3GPP Draft; R1-1707694, 3rd Generation Partnership Project (3GPP), Mobile Competence Centre; 650, Route Des Lucioles; F-06921 Sophia-Antipolis Cedex; France, vol. RAN WG1, no. Hangzhou; May 15, 2017-May 19, 2017 May 14, 2017 (May 14, 2017), XP051272900, paragraph 2.6.

International Search Report in the international application No. PCT/CN2017/100886, dated Apr. 28, 2018.

English translation of the Written Opinion of the International Search Authority in the international application No. PCT/CN2017/100886, dated Apr. 28, 2018.

Supplementary European Search Report in the European application No. 17924371.2, dated Jul. 27, 2020.

First Office Action of the Chinese application No. 201780001548.X, dated Aug. 27, 2021.

* cited by examiner

METHOD AND DEVICE FOR REALIZING SIGNALING DETECTION, USER EQUIPMENT, AND BASE STATION

CROSS-REFERENCE TO RELATED APPLICATION

The present application is a national stage of International Application No. PCT/CN2017/100886 filed on Sep. 7, 2017, the disclosure of which is hereby incorporated by reference in its entirety.

TECHNICAL FIELD

The present disclosure generally relates to the technical field of communication, and more particularly, to a method for implementing signaling detection and device, User Equipment (UE) and a base station.

BACKGROUND

In a Long-Term Evolution (LTE) system, uplink and downlink transmission of UE is generally implemented based on scheduling of a base station. The UE, when being in an active state, needs to detect whether there is scheduling signaling for it or not on each transmission unit such as each subframe. The UE may search a position where the downlink scheduling signaling may appear for a corresponding Downlink Control Information (DCI) format according to a transmission mode supported by the UE, the detection performance of scheduling signaling and the detection complexity may be influenced by the number of detections supported by the UE on each transmission unit. When the number of detections supported by the UE is higher, the detection performance of scheduling signaling can be higher but the detection complexity and power consumption of the UE may be increased accordingly.

In a related art, in researches and discussions about 5th Generation (5G) projects, since a bandwidth of a working carrier is wide, multiple control regions configured to detect control information may be configured for UE; and moreover, the UE may support different scheduling types. These factors may cause great increase of detection complexity of the UE. In the related art, detection of a control channel configured for UE by a base station may be beyond a detection capability of the UE, and consequently, the UE cannot successfully detect whether there is scheduling signaling for itself or not; or the detection efficiency of the UE may be reduced by excessively high detection complexity of the UE.

SUMMARY

For solving the problem in the related art, embodiments of the present disclosure provide a method and device for implementing signaling detection, UE and a base station. UE may report a detection capability through preset signaling, and a base station may further configure a detection control parameter for the UE based on the detection capability, so that the efficiency of detection of scheduling signaling of the UE can be improved.

According to a first aspect of the embodiments of the present disclosure, a method for implementing signaling detection is provided, which may be applied to UE and include that:

information for identifying a detection capability is determined based on a signaling detection capability supported by the UE; and the information for identifying a detection capability is reported to a base station.

In an embodiment, the operation that the information for identifying a detection capability is reported to the base station may include that:

the information for identifying a detection capability is reported through a first message in a random access procedure.

In an embodiment, the operation that the information for identifying a detection capability is determined may include that:

a random access preamble corresponding to the signaling detection capability supported by the UE is determined.

In an embodiment, the random access preamble may include an information field corresponding to the signaling detection capability supported by the UE.

In an embodiment, the operation that the information for identifying a detection capability is determined may include that:

a preamble set corresponding to the signaling detection capability supported by the UE is determined; and a preamble is selected from the preamble set as the information for identifying a detection capability.

In an embodiment, the operation that the information for identifying a detection capability is reported to the base station may include that:

the information for identifying a detection capability is reported through a third message in the random access procedure.

In an embodiment, the method may further include that:

a request, sent by the base station through Radio Resource Control (RRC) signaling, or a Media Access Control (MAC) control element or physical-layer signaling, for reporting the signaling detection capability supported by the UE is received.

In an embodiment, the operation that the information for identifying a detection capability is reported to the base station may include that:

the information for identifying a detection capability is reported through an uplink control channel or an uplink data channel to the base station on a time-frequency resource specified by the base station.

According to a second aspect of the embodiments of the present disclosure, a method for implementing signaling detection is provided, which may be applied to a base station and include that:

information for identifying a detection capability reported by UE is received; and a signaling detection capability of the UE is determined based on the information for identifying a detection capability of the UE.

In an embodiment, the method may further include that:

a detection control parameter configured for the UE is determined based on the signaling detection capability of the UE; and detection control signaling is sent to the UE, the detection control signaling containing the detection control parameter.

In an embodiment, before the operation that the information for identifying a detection capability reported by the UE is received, the method may further include that:

a request for reporting the signaling detection capability is sent to the UE through RRC signaling, a MAC control element or physical-layer signaling.

According to a third aspect of the embodiments of the present disclosure, a device for implementing signaling detection is provided, which may be applied to UE and include:

a first determination module, configured to determine information for identifying a detection capability based on a signaling detection capability supported by the UE; and a capability reporting module, configured to report the information for identifying a detection capability to a base station.

In an embodiment, the capability reporting module may include:

a first sending submodule, configured to report the information for identifying a detection capability through a first message in a random access procedure.

In an embodiment, the first determination module may include:

a first determination submodule, configured to determine a random access preamble corresponding to the signaling detection capability supported by the UE.

In an embodiment, the random access preamble may include an information field corresponding to the signaling detection capability supported by the UE.

In an embodiment, the first determination module may include:

a second determination submodule, configured to determine a preamble set corresponding to the signaling detection capability supported by the UE; and a selection submodule, configured to select a preamble from the preamble set as the information for identifying a detection capability.

In an embodiment, the capability reporting module may include:

a second sending submodule, configured to report the information for identifying a detection capability through a third message in the random access procedure.

In an embodiment, the device may further include:

a first receiving module, configured to receive a request, sent by the base station through RRC signaling, or a MAC control element or physical-layer signaling, for reporting the signaling detection capability supported by the UE.

In an embodiment, the capability reporting module may include:

a third sending submodule, configured to report the information for identifying a detection capability through an uplink control channel or an uplink data channel to the base station on a time-frequency resource specified by the base station.

According to a fourth aspect of the embodiments of the present disclosure, a device for implementing signaling detection is provided, which may be applied to a base station and include:

a second receiving module, configured to receive information for identifying a detection capability reported by UE; and a second determination module, configured to determine a signaling detection capability of the UE based on the information for identifying a detection capability, received by the second receiving module, of the UE.

In an embodiment, the device may further include:

a third determination module, configured to determine, based on the signaling detection capability of the UE, a detection control parameter configured for the UE; and a first sending module, configured to send detection control signaling to the UE, the detection control signaling containing the detection control parameter sent by the third determination module.

In an embodiment, the device may further include:

a second sending module, configured to send, through RRC signaling or a MAC control element or physical-layer signaling, a request for reporting the signaling detection capability to the UE.

According to a fifth aspect of the embodiments of the present disclosure, UE is provided, which may include:

a processor; and a memory configured to store an instruction executable by the processor, wherein the processor may be configured to:

determine information for identifying a detection capability based on a signaling detection capability supported by the UE; and report the information for identifying a detection capability to a base station.

According to a sixth aspect of the embodiments of the present disclosure, a base station is provided, which may include:

a processor; and a memory configured to store an instruction executable by the processor, wherein the processor may be configured to:

receive information for identifying a detection capability reported by UE; and determine a signaling detection capability of the UE based on the information for identifying a detection capability of the UE.

According to a seventh aspect of the embodiments of the present disclosure, a non-transitory computer-readable storage medium is provided, which has a computer instruction stored thereon for execution by a processor to implement steps of:

determining information for identifying a detection capability based on a signaling detection capability supported by UE; and reporting the information for identifying a detection capability to a base station.

According to an eighth aspect of the embodiments of the present disclosure, a non-transitory computer-readable storage medium is provided, which has a computer instruction stored thereon for execution by a processor to implement steps of:

receiving information for identifying a detection capability reported by UE; and determining a signaling detection capability of the UE based on the information for identifying a detection capability of the UE.

The technical solutions provided in the embodiments of the present disclosure may have the following beneficial effects.

UE may report information for identifying a detection capability to a base station to indicate a signaling detection capability supported by the UE to enable the base station to configure a detection control parameter based on the signaling detection capability of the UE, so that the success rate of signaling detection and the detection efficiency of the UE are improved.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1A:
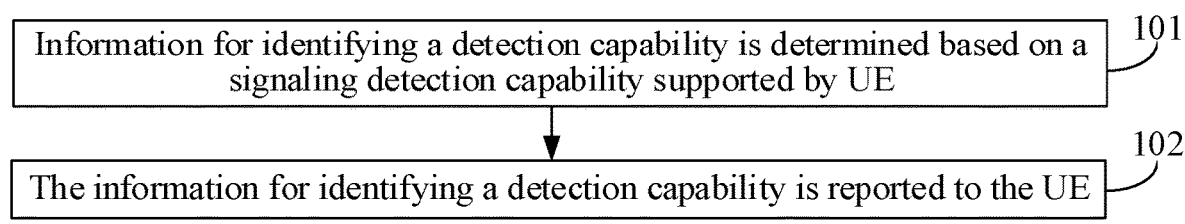
FIG. 1A is a flowchart showing a method for implementing signaling detection according to an exemplary embodiment.
Figure 1B:
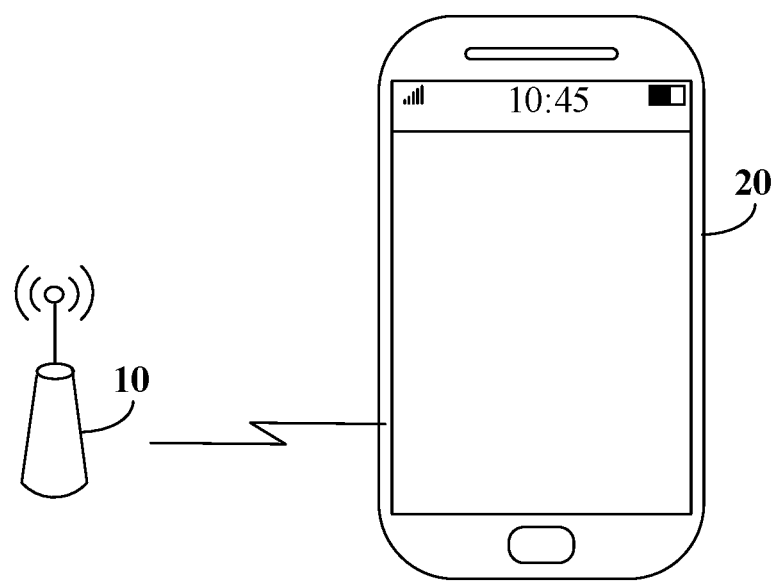
FIG. 1B is a scenario diagram of a method for implementing signaling detection according to an exemplary embodiment.

FIG. 1A is a flowchart showing a method for implementing signaling detection according to an exemplary embodiment. FIG. 1B is a scenario diagram of a method for implementing signaling detection according to an exemplary embodiment. The method for implementing signaling detection may be applied to UE. As shown in FIG. 1A, the method for implementing signaling detection includes the following Steps 101-102.

In Step 101, information for identifying a detection capability is determined based on a signaling detection capability supported by the UE.

In an embodiment, the detection capability supported by the UE may be measured by one or combination of more than two of the following information: the number of detections, an aggregation level supported by the UE, a time capability of control signaling processing, and the like.

In an embodiment, the information for identifying a detection capability may be an existing communication parameter, for example, a random access preamble. A mapping relationship between a random access preamble and a signaling detection capability may be established, and then the random access preamble may be used as the information for identifying a detection capability identifying the signaling detection capability. For example, if sequence 1 corresponds to a first signaling detection capability and sequence 2 corresponds to a second signaling detection capability, then information for identifying a detection capability of the first signaling detection capability is the sequence 1, and information for identifying a detection capability of the second signaling detection capability is the sequence 2.

In an embodiment, the information for identifying a detection capability may be dedicated information configured to identify the signaling detection capability.

In an embodiment, the information for identifying a detection capability may be obtained by redesigning the existing communication parameter. For example, when the random access preamble is designed, an information field configured to identify the signaling detection capability may be added to a preset position of the random access preamble to obtain a set of new random access preambles, and the set of new random access preambles may be used for random access and for reporting of the information detection capability.

Figure 2:
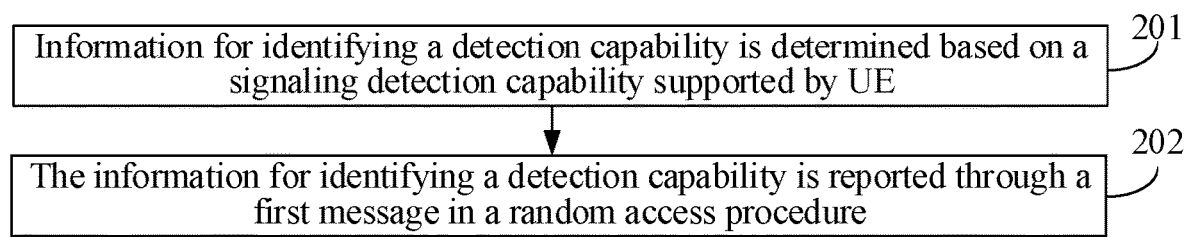
FIG. 2 is a flowchart showing another method for implementing signaling detection according to an exemplary embodiment.
Figure 3:
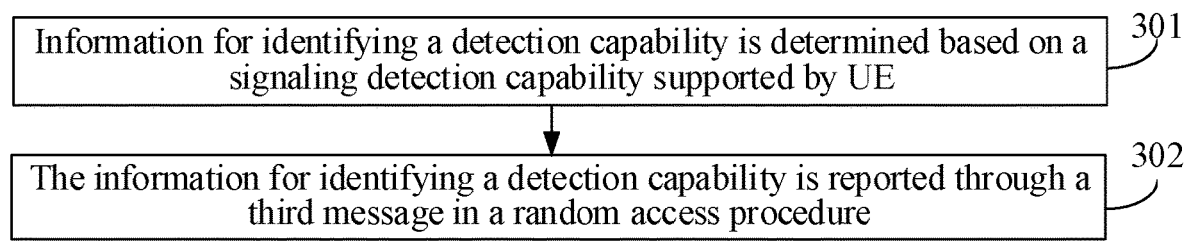
FIG. 3 is a flowchart showing another method for implementing signaling detection according to an exemplary embodiment.

In an embodiment, a method for determining the information for identifying a detection capability based on the signaling detection capability supported by the UE may refer to the embodiment shown in FIG. 2 to FIG. 3, and elaborations thereof are omitted herein.

In Step 102, the information for identifying a detection capability is reported to a base station.

In an embodiment, the information for identifying a detection capability may be reported in a first message MSG1 in a random access procedure, and the information for identifying a detection capability may be the random access preamble. In an embodiment, the information for identifying a detection capability may be reported in a third message MSG3 in the random access procedure, and the information for identifying a detection capability may be dedicated information configured to indicate the information detection capability.

In an embodiment, the UE may report the information for identifying a detection capability based on triggering of the base station after completing a random access process. Please refer to descriptions in the embodiment shown in FIG. 4, and elaborations thereof are omitted herein.

In an exemplary scenario, as shown in FIG. 1B, exemplary descriptions are made with the condition that a mobile network is a 5G network as an example (the technical solution of the present disclosure is also applied to another communication system and is not limited to the 5G network). The scenario shown in FIG. 1B includes a base station 10 and UE 20. The UE 20 may report information for identifying a detection capability configured to identify a signaling detection capability of the UE. The base station 10, after receiving the information for identifying a detection capability, may determine the signaling detection capability of the UE 20 and further configure a detection control parameter for the UE based on the signaling detection capability of the UE 20. The success rate of signaling detection and the detection efficiency of the UE 20 are ensured.

In the embodiment, through Step 101 to Step 102, the UE may report the information for identifying a detection capability to the base station to indicate the signaling detection capability supported by the UE to enable the base station to configure a detection control parameter based on the signaling detection capability of the UE, so that the success rate of signaling detection and the detection efficiency of the UE are improved.

The technical solution provided in the embodiment of the present disclosure will be provided below with specific embodiments.

FIG. 2 is a flowchart showing another method for implementing signaling detection according to an exemplary embodiment. In the embodiment, exemplary descriptions are made based on the method provided in the embodiment of the present disclosure with the condition that UE reports a signaling detection capability through a first message in a random access request as an example. As shown in FIG. 2, the following steps are included.

In Step 201, information for identifying a detection capability is determined based on a signaling detection capability supported by UE.

In an embodiment, when the signaling information for identifying a detection capability is reported through a first message in a random access request, the information for identifying a detection capability may be a random access preamble.

In an embodiment, a system may predetermine a corresponding relationship between a random access preamble and a signaling detection capability, and the UE may determine the random access preamble corresponding to the supported signaling detection capability based on the corresponding relationship. For example, if sequence 1 corresponds to a first signaling detection capability, then, when the UE determines that the signaling detection capability supported by the UE is the first signaling detection capability, the sequence 1 may be selected as the random access preamble during random access.

In an embodiment, the system may divide a random access preamble sequence into N sets based on the number N of signaling detection capabilities, one signaling detection capability corresponding to one set, and the UE may select a random access preamble from the corresponding set based on the signaling detection capability supported by the UE to initiate an initial access process.

In an embodiment, the system may add an information field representing the signaling detection capability of the UE to a fixed position in the random access preamble sequence when the random access preamble is designed. An information value of the information field corresponds to a signaling detection capability. For example, when an information value of the information field representing the signaling detection capability is 001, the information value may correspond to a first signaling detection capability, and when the supported signaling detection capability is the first signaling detection capability, the UE may select a random access preamble where a value of an information field representing the signaling detection capability is 001 to initiate the initial access process. In an embodiment, a length of the information field representing the signaling detection capability of the UE may be predefined based on the number of signaling detection capabilities supported by the UE. For example, if the number of the signaling detection capabilities supported by the UE is 8, the length of the information field may be set to be 3 bits.

In Step 202, the information for identifying a detection capability is reported through a first message in a random access procedure.

In an embodiment, the first message may be sent on a time-frequency resource for the first message in the random access procedure, the message containing the information for identifying a detection capability.

In the embodiment, a manner for reporting a detection capability is provided, that is, information for identifying a detection capability may be reported through a random access preamble in a first message in a random access procedure, so that reporting of the information for identifying a detection capability may be implemented without any additional communication resource cost. In addition, multiple manners for determining a random access preamble based on a signaling detection capability are also provided, so that UE may be helped to flexibly indicate the signaling detection capability supported by itself to the base station based on the random access preamble.

FIG. 3 is a flowchart showing another method for detection of scheduling signaling according to an exemplary embodiment. In the embodiment, exemplary descriptions are made based on the method provided in the embodiment of the present disclosure with the condition that UE reports a signaling detection capability through a third message in a random access request as an example. As shown in FIG. 3, the following steps are included.

In Step 301, information for identifying a detection capability is determined based on a signaling detection capability supported by UE.

In an embodiment, a system may set a piece of dedicated information for identifying the signaling detection capability.

In Step 302, the information for identifying a detection capability is reported through a third message in a random access procedure.

In an embodiment, the information for identifying a detection capability may be contained in the third message in the random access procedure.

In the embodiment, a manner for reporting a detection capability is provided. Information for identifying a detection capability may be reported through the third message in a random access procedure, so that additional signaling resource waste is avoided.

Figure 4:
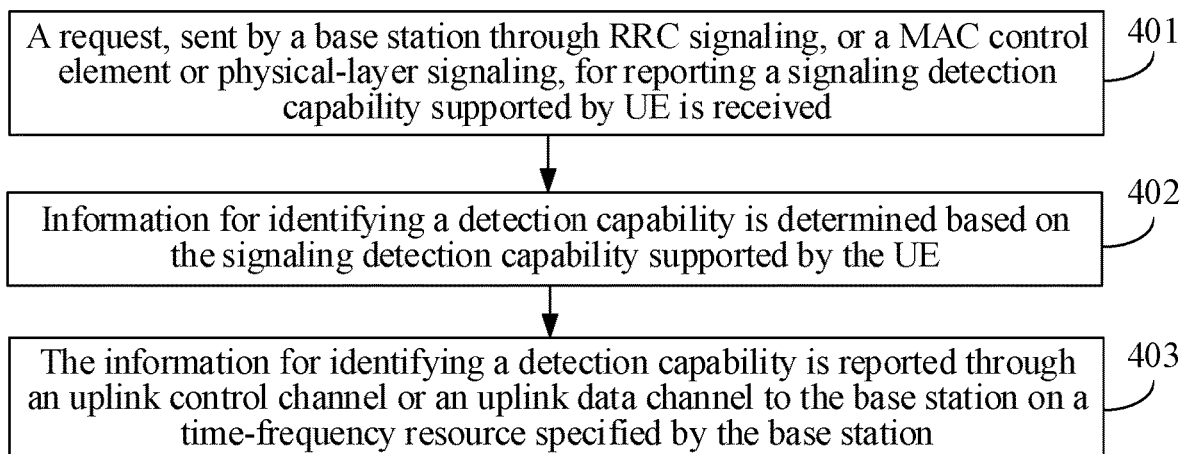
FIG. 4 is a flowchart showing another method for implementing signaling detection according to an exemplary embodiment.

FIG. 4 is a flowchart showing another method for implementing signaling detection according to an exemplary embodiment. In the embodiment, exemplary descriptions are made based on the method provided in the embodiment of the present disclosure with the condition that UE reports a signaling detection capability after completing a random access process as an example. As shown in FIG. 4, the following steps are included.

In Step 401, a request, sent by a base station through RRC signaling or a MAC control element or physical-layer signaling, for reporting a signaling detection capability supported by UE is received.

In Step 402, information for identifying a detection capability is determined based on the signaling detection capability supported by the UE.

In Step 403, the information for identifying a detection capability is reported through an uplink control channel or an uplink data channel to the base station on a time-frequency resource specified by the base station.

In an embodiment, the information for identifying a detection capability may be reported through the uplink control channel or the uplink data channel, or the information for identifying a detection capability may also be reported on a newly defined uplink channel.

In an embodiment, the base station may specify for the UE a time-frequency resource position configured to report the information for identifying a detection capability.

In the embodiment, a manner for reporting a signaling detection capability is provided. UE that has completed a random access process may report a signaling detection capability in real time in this manner, so that real-time performance of reporting an information detection capability is improved.

Figure 5:
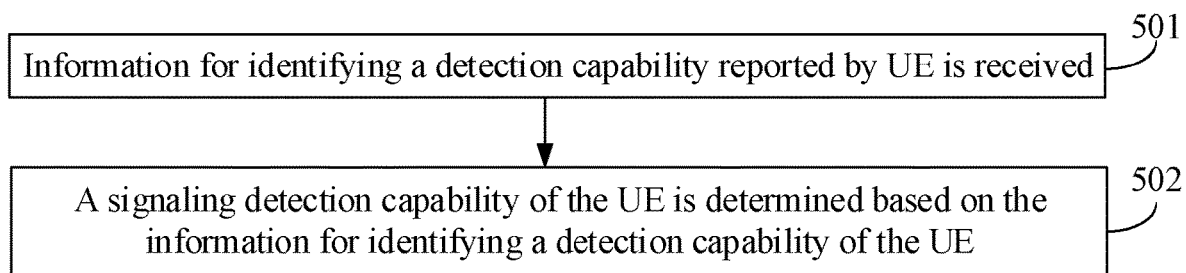
FIG. 5 is a flowchart showing a method for implementing signaling detection according to an exemplary embodiment.

FIG. 5 is a flowchart showing a method for implementing signaling detection according to an exemplary embodiment. The method for detection of scheduling signaling may be applied to a base station. As shown in FIG. 5, the method for implementing signaling detection includes the following Steps 501-502.

In Step 501, information for identifying a detection capability reported by UE is received.

In an embodiment, the UE may actively report the information for identifying a detection capability through a first message or third message in a random access procedure. In an embodiment, the base station may also send a request for reporting a signaling detection capability to the UE through RRC signaling or a MAC control element or physical-layer signaling. The UE, upon receiving the request, may report the information for identifying a detection capability on a specified time-frequency resource through an uplink control channel or an uplink data channel.

In Step 502, a signaling detection capability of the UE is determined based on the information for identifying a detection capability of the UE.

In an exemplary scenario, as shown in FIG. 1B, exemplary descriptions are made with the condition that a mobile network is a 5G network as an example (the technical solution of the present disclosure is also applied to another communication system and is not limited to the 5G network). The scenario shown in FIG. 1B includes a base station 10 and UE 20. The UE 20 may report detection capability identification information configured to identify a signaling detection capability of the UE, and the base station 10, after receiving the detection capability identification information, may determine the signaling detection capability of the UE 20 and further configure a detection control parameter for the UE based on the signaling detection capability of the UE 20. The success rate of signaling detection and the detection efficiency of the UE 20 are ensured.

In the embodiment, the base station may determine the signaling detection capability based on the received detection capability identification information and further configure a detection control parameter for the UE, so that the success rate of signaling detection and the detection efficiency of the UE are improved.

Figure 6:
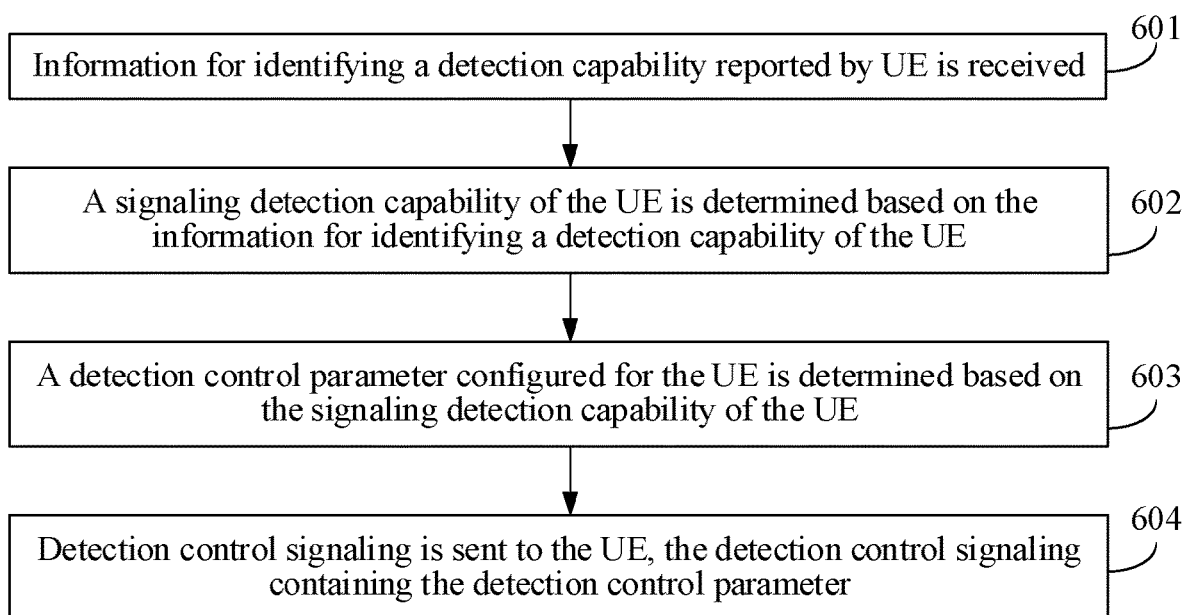
FIG. 6 is a flowchart showing another method for implementing signaling detection according to an exemplary embodiment.

FIG. 6 is a flowchart showing another method for implementing signaling detection according to an exemplary embodiment. In the embodiment, exemplary descriptions are made based on the method provided in the embodiment of the present disclosure with a base station as an example. As shown in FIG. 6, the following steps are included.

In Step 601, information for identifying a detection capability reported by UE is received.

In Step 602, a signaling detection capability of the UE is determined based on the information for identifying a detection capability of the UE.

In an embodiment, descriptions about Step 601 and Step 602 may refer to the descriptions about Step 501 and Step 502 in the embodiment shown in FIG. 5 and elaborations are omitted herein.

In Step 603, a detection control parameter configured for the UE is determined based on the signaling detection capability of the UE.

In an embodiment, the detection control parameter may influence signaling detection of the UE, and may include an aggregation level, a DCI format to be detected, the number of detections required by each aggregation level and the like.

In an embodiment, the base station may configure the detection control parameter corresponding to the terminal based on the detection capability reported by the UE and other information, for example, a channel condition and a supported transmission mode, of the UE.

In Step 604, detection control signaling is sent to the UE, the detection control signaling containing the detection control parameter.

In the embodiment, the base station may configure a corresponding detection control parameter based on the signaling detection capability of the UE, thereby solving the problem in the related art that a detection control parameter configured for UE by a base station may be beyond a signaling detection capability of the UE, and ensuring the success rate of signaling detection and the detection efficiency of the UE.

Figure 7:
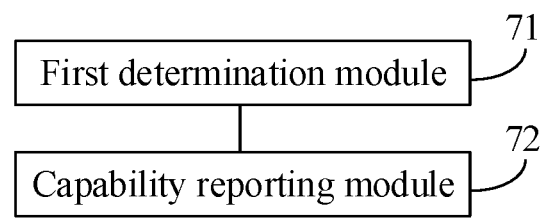
FIG. 7 is a block diagram of a device for implementing signaling detection according to an exemplary embodiment.

FIG. 7 is a block diagram of a device for implementing signaling detection according to an exemplary embodiment. As shown in FIG. 7, the device for implementing signaling detection includes:

a first determination module 71, configured to determine information for identifying a detection capability based on a signaling detection capability supported by UE; and a capability reporting module 72, configured to report the information for identifying a detection capability to a base station.

In the embodiment, the UE may report the information for identifying a detection capability to a base station to indicate the signaling detection capability supported by the UE to enable the base station to configure a corresponding detection control parameter based on the signaling detection capability of the UE, so that the success rate of signaling detection and the detection efficiency of the UE are improved.

Figure 8:
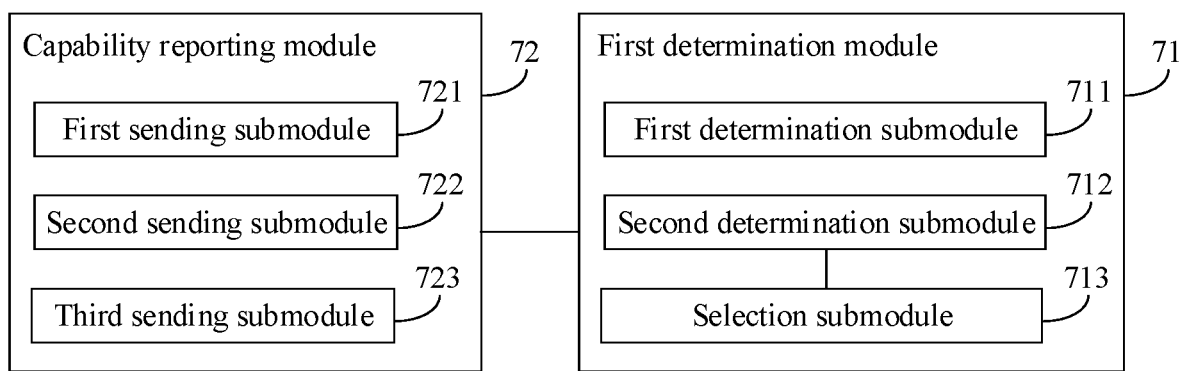
FIG. 8 is a block diagram of another device for implementing signaling detection according to an exemplary embodiment.

FIG. 8 is a block diagram of another device for implementing signaling detection according to an exemplary embodiment. As shown in FIG. 8, based on the embodiment shown in FIG. 7, in an embodiment, the capability reporting module 72 includes:

a first sending submodule 721, configured to report the information for identifying a detection capability through a first message in a random access procedure.

In the embodiment, a manner for reporting a detection capability is provided. Information for identifying a detection capability may be reported through a random access preamble in a first message in a random access procedure, so that reporting of the information for identifying a detection capability may be implemented without any additional communication resource cost.

In an embodiment, the first determination module 71 includes:

a first determination submodule 711, configured to determine a random access preamble corresponding to the signaling detection capability supported by the UE.

In the embodiment, a manner of reporting the signaling detection capability based on the random access preamble is provided, so that no additional communication parameter is needed to be designed, and simplicity in implementation is ensured.

In an embodiment, the random access preamble may include an information field corresponding to the signaling detection capability supported by the UE.

In the embodiment, a manner of reporting a signaling detection capability based on a random access preamble is provided. A set of random access preambles including an information field of a signaling detection capability may be predefined, so that the information detection capability may be automatically reported.

In an embodiment, the first determination module 71 includes:

a second determination submodule 712, configured to determine a preamble set corresponding to the signaling detection capability supported by the UE; and a selection submodule 713, configured to select a preamble from the preamble set as the information for identifying a detection capability.

In the embodiment, a mapping relationship between a preamble set and a signaling detection capability may be predefined, each signaling detection capability may correspond to multiple random access preambles, so that multiple random access preamble may be provided for the UE as options when the random access procedure is initiated, and thus an access success rate of the UE is increased.

In an embodiment, the capability reporting module 72 may include:

a second sending submodule 722, configured to report the information for identifying a detection capability through a third message in the random access procedure.

In the embodiment, a manner for reporting a detection capability is provided. Information for identifying a detection capability may be reported through a third message in a random access procedure, so that reporting of the information for identifying a detection capability may be implemented without any additional communication resource cost.

In an embodiment, the device may further include:

a first receiving module, configured to receive a request, sent by the base station through RRC signaling or a MAC control element or physical-layer signaling, for reporting the signaling detection capability supported by the UE.

In an embodiment, the capability reporting module 72 may include:

a third sending submodule 723, configured to report the information for identifying a detection capability through an uplink control channel or an uplink data channel to the base station on a time-frequency resource specified by the base station.

In the embodiment, a manner for reporting a signaling detection capability is provided. UE that has completed a random access process may report a signaling detection capability in real time in this manner, so that the real-time performance of reporting an information detection capability is improved.

Figure 9:
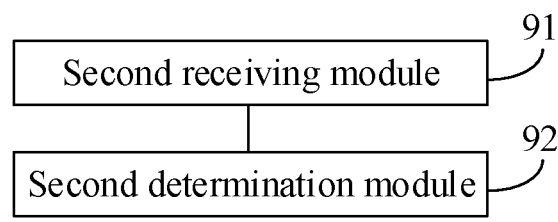
FIG. 9 is a block diagram of a device for implementing signaling detection according to an exemplary embodiment.

FIG. 9 is a block diagram of a device for implementing signaling detection according to an exemplary embodiment. The device for implementing signaling detection is applied to a base station, and as shown in FIG. 9, includes:

a second receiving module 91, configured to receive information for identifying a detection capability reported by UE; and a second determination module 92, configured to determine a signaling detection capability of the UE based on the information for identifying a detection capability, received by the second receiving module 91, of the UE.

In the embodiment, the base station may determine the signaling detection capability based on the received information for identifying a detection capability and further configure a detection control parameter for the UE, so that the success rate of signaling detection and the detection efficiency of the UE are improved.

Figure 10:
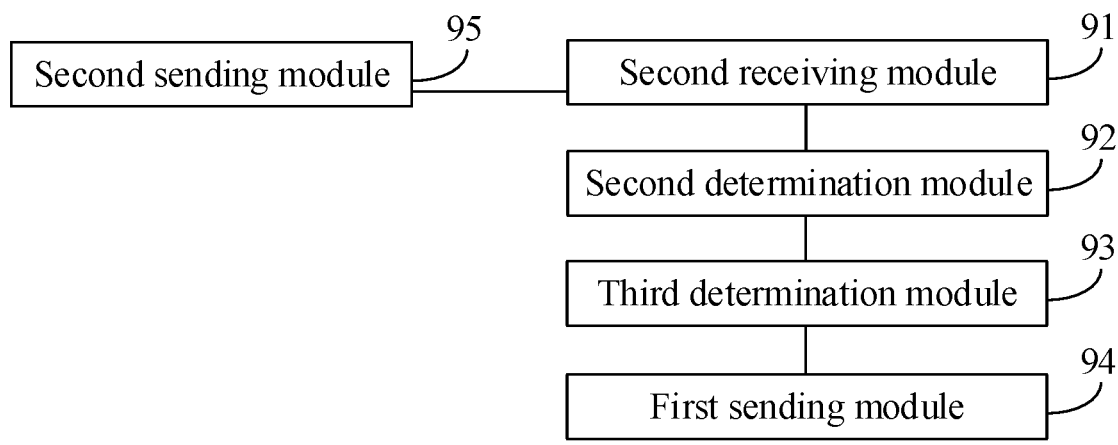
FIG. 10 is a block diagram of another device for implementing signaling detection according to an exemplary embodiment.

FIG. 10 is a block diagram of another device for implementing signaling detection according to an exemplary embodiment. As shown in FIG. 10, based on the embodiment shown in FIG. 9, in an embodiment, the device further includes:

a third determination module 93, configured to determine, based on the signaling detection capability of the UE, a detection control parameter configured for the UE; and a first sending module 94, configured to send detection control signaling to the UE, the detection control signaling containing the detection control parameter sent by the third determination module 93.

In the embodiment, a base station may configure a corresponding detection control parameter based on a signaling detection capability of UE, thereby solving the problem in the related art that a detection control parameter configured for UE by a base station may be beyond a signaling detection capability of the UE, and ensuring the success rate of signaling detection and the detection efficiency of the UE.

In an embodiment, the device may further include:

a second sending module 95, configured to send a request for reporting the signaling detection capability to the UE through RRC signaling or a MAC control element or physical-layer signaling.

In the embodiment, the UE may be instructed to report the signaling detection capability, so that the signaling detection capability of the UE may be acquired in real time.

With respect to the device in the above embodiment, the specific manners for performing operations for individual modules therein have been described in detail in the embodiment regarding the method, which will not be elaborated herein.

Figure 11:
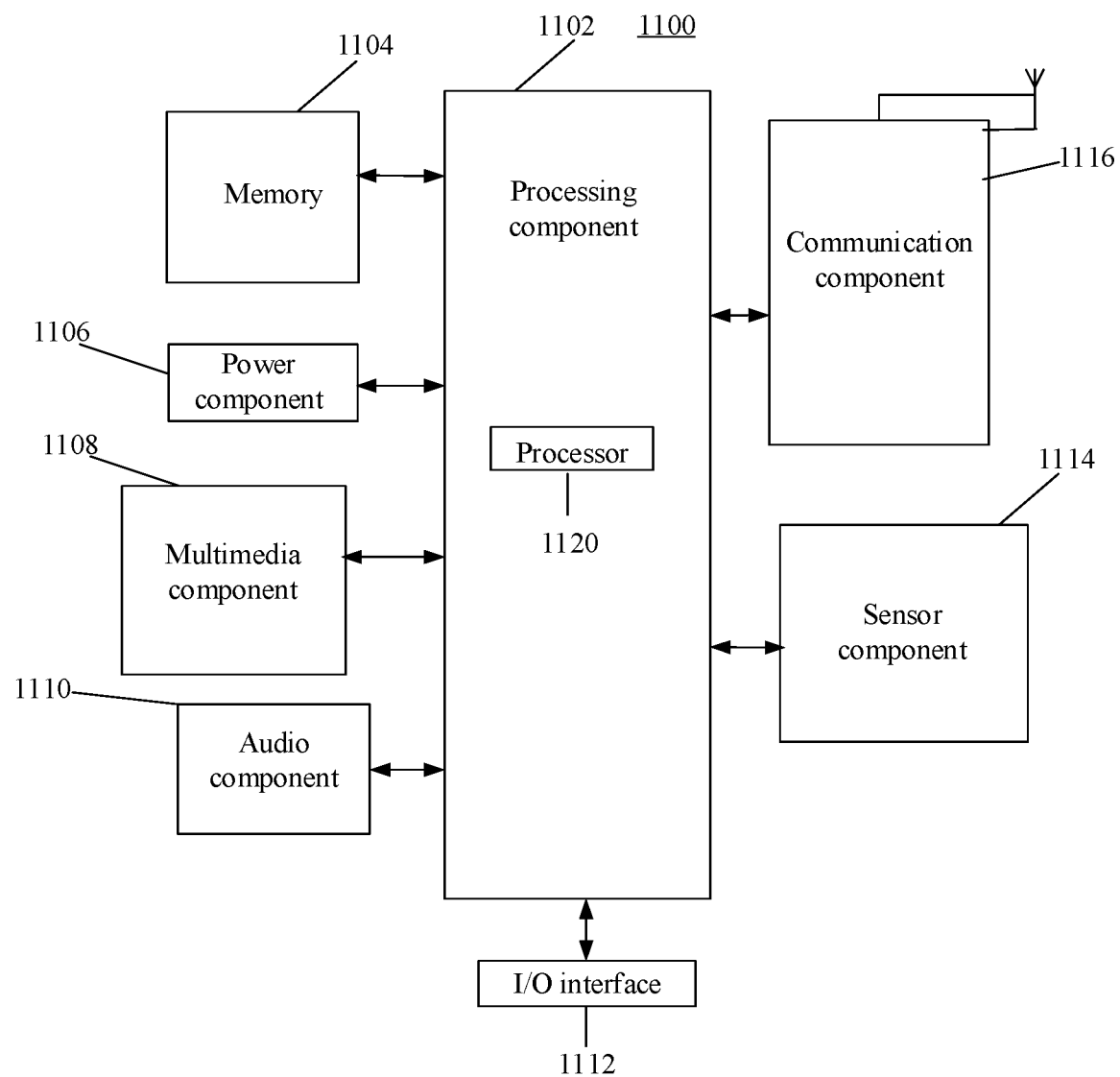
FIG. 11 is a block diagram of a device applicable to implementation of signaling detection according to an exemplary embodiment.

FIG. 11 is a block diagram of a device applicable to implementation of signaling detection according to an exemplary embodiment. For example, the device 1100 may be UE such as a mobile phone, a computer, a digital broadcast terminal, a messaging device, a gaming console, a tablet, a medical device, exercise equipment and a personal digital assistant.

Referring to FIG. 11, the device 1100 may include one or more of the following components: a processing component 1102, a memory 1104, a power component 1106, a multimedia component 1108, an audio component 1112, an Input/Output (I/O) interface 1112, a sensor component 1114, and a communication component 1116.

The processing component 1102 is typically configured to control overall operations of the device 1100, such as the operations associated with display, telephone calls, data communications, camera operations, and recording operations. The processing component 1102 may include one or more processors 1120 to execute instructions to perform all or part of the steps in the abovementioned method. Moreover, the processing component 1102 may include one or more modules which facilitate interaction between the processing component 1102 and the other components. For instance, the processing component 1102 may include a multimedia module to facilitate interaction between the multimedia component 1108 and the processing component 1102.

The memory 1104 is configured to store various types of data to support the operation of the device 1100. Examples of such data may include instructions for any application programs or methods operated on the device 1100, contact data, phonebook data, messages, pictures, video, etc. The memory 1104 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1106 may provide power for various components of the device 1100. The power component 1106 may include a power management system, one or more power supplies, and other components associated with generation, management and distribution of power for the device 1100.

The multimedia component 1108 may include a screen providing an output interface between the device 1100 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1108 includes a front camera and/or a rear camera. The front camera and/or the rear camera may receive external multimedia data when the device 1100 is in an operation mode, such as a photographing mode or a video mode. Each of the front camera and the rear camera may be a fixed optical lens system or have focusing and optical zooming capabilities.

The audio component 1112 is configured to output and/or input an audio signal. For example, the audio component 1112 includes a Microphone (MIC), and the MIC is configured to receive an external audio signal when the device 1100 is in the operation mode, such as a call mode, a recording mode and a voice recognition mode. The received audio signal may further be stored in the memory 1104 or sent through the communication component 1116. In some embodiments, the audio component 1112 further includes a speaker configured to output the audio signal.

The I/O interface 1112 may provide an interface between the processing component 1102 and a peripheral interface module, and the peripheral interface module may be a keyboard, a click wheel, a button and the like. The button may include, but not limited to: a home button, a volume button, a starting button and a locking button.

The sensor component 1114 may include one or more sensors configured to provide status assessment in various aspects for the device 1100. For instance, the sensor component 1114 may detect an on/off status of the device 1100 and relative positioning of components, such as a display and small keyboard of the device 1100, and the sensor component 1114 may further detect a change in a position of the device 1100 or a component of the device 1100, presence or absence of contact between the user and the device 1100, orientation or acceleration/deceleration of the device 1100 and a change in temperature of the device 1100. The sensor component 1114 may include a proximity sensor configured to detect presence of an object nearby without any physical contact. The sensor component 1114 may also include a light sensor, such as a Complementary Metal Oxide Semiconductor (CMOS) or Charge Coupled Device (CCD) image sensor, configured for use in an imaging application. In some embodiments, the sensor component 1114 may also include an acceleration sensor, a gyroscope sensor, a magnetic sensor, a pressure sensor or a temperature sensor.

The communication component 1116 is configured to facilitate wired or wireless communication between the device 1100 and another device. The device 1100 may access a communication-standard-based wireless network, such as a Wireless Fidelity (Wi-Fi) network, a 2nd-Generation (2G) or 3rd-Generation (3G) network or a combination thereof. In an exemplary embodiment, the communication component 1116 receives a broadcast signal or broadcast associated information from an external broadcast management system through a broadcast channel. In an exemplary embodiment, the communication component 1116 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction. For example, the memory 1104 includes an instruction, the instruction being executable by the processor 1120 of the device 1100 to execute the abovementioned method including that: determining information for identifying a detection capability based on a signaling detection capability supported by UE; and reporting the information for identifying a detection capability to a base station.

Figure 12:
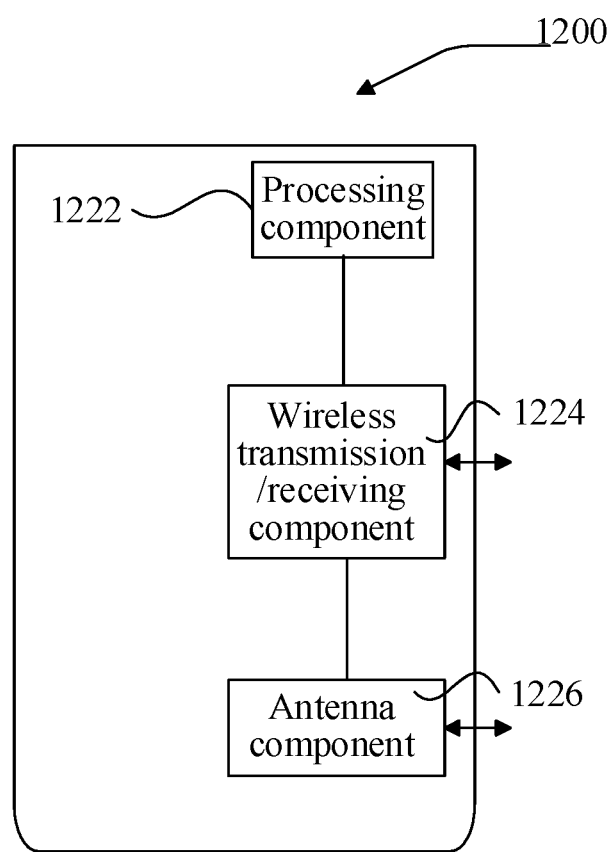
FIG. 12 is a block diagram of a device applicable to implementation of signaling detection according to an exemplary embodiment.

FIG. 12 is a block diagram of a device applicable to implementation of signaling detection according to an exemplary embodiment. The device 1200 may be provided as a base station. Referring to FIG. 12, the device 1200 includes a processing component 1222, a wireless transmission/receiving component 1224, an antenna component 1226 and a wireless interface-specific signal processing part, and the processing component 1222 may further include one or more processors.

One processor in the processing component 1222 may be configured to receive information for identifying a detection capability reported by UE and determine a signaling detection capability of the UE based on the information for identifying a detection capability of the UE.

In an exemplary embodiment, a non-transitory computer-readable storage medium including an instruction is also provided in a base station, which has a computer instruction stored thereon and is characterized in that the instruction is executable by a processor to implement the following steps of:

receiving information for identifying a detection capability reported by UE; and determining a signaling detection capability of the UE based on the information for identifying a detection capability of the UE.

Other implementation solutions of the present disclosure will be apparent to those skilled in the art from consideration of the specification and practice of the present disclosure. This present application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A method for implementing signaling detection, applied to User Equipment (UE), the method comprising:
    determining information for identifying a detection capability based on a signaling detection capability supported by the UE; and
    reporting the information for identifying a detection capability to a base station in a random access procedure,
    wherein the signaling detection capability supported by the UE comprises number of detections;
    wherein the determining the information for identifying a detection capability comprises:
        determining a random access preamble corresponding to the signaling detection capability supported by the UE,
        wherein the random access preamble comprises an information field corresponding to the signaling detection capability supported by the UE.

2. The method of claim 1, wherein reporting the information for identifying a detection capability to the base station comprises:
    reporting the information for identifying a detection capability through a first message in the random access procedure.

3. The method of claim 1, wherein reporting the information for identifying a detection capability to the base station comprises:
    reporting the information for identifying a detection capability through a third message in the random access procedure.

4. The method of claim 1, further comprising:
    receiving a request, sent by the base station through Radio Resource Control (RRC) signaling or a Media Access Control (MAC) control element or physical-layer signaling, for reporting the signaling detection capability supported by the UE.

5. The method of claim 4, wherein reporting the information for identifying a detection capability to the base station comprises:
    reporting the information for identifying a detection capability to the base station on a time-frequency resource specified by the base station through an uplink control channel or an uplink data channel.

6. A method for implementing signaling detection, applied to a base station, the method comprising:
    receiving information for identifying a detection capability reported by User Equipment (UE) in a random access procedure; and
    determining a signaling detection capability of the UE based on the information for identifying a detection capability of the UE,
    wherein the signaling detection capability of the UE comprises number of detections,
    wherein the information for identifying a detection capability reported by the UE is determined by determining a random access preamble corresponding to the signaling detection capability supported by the UE, and
    wherein the random access preamble comprises an information field corresponding to the signaling detection capability supported by the UE.

7. The method of claim 6, further comprising:
    determining, based on the signaling detection capability of the UE, a detection control parameter configured for the UE; and
    sending detection control signaling to the UE, wherein the detection control signaling contains the detection control parameter.

8. The method of claim 6, before receiving the information for identifying a detection capability reported by the UE, further comprising:
    sending, through Radio Resource Control (RRC) signaling or a Media Access Control (MAC) control element or physical-layer signaling, a request for reporting the signaling detection capability to the UE.

9. A device, comprising:
    a processor; and
    memory configured to store an instruction executable by the processor,
    wherein the processor is configured to:
    determine information for identifying a detection capability based on a signaling detection capability supported by UE; and
    report the information for identifying a detection capability to a base station in a random access procedure,
    wherein the signaling detection capability supported by the UE comprises number of detections,
    wherein the processor is further configured to:
    determine a random access preamble corresponding to the signaling detection capability supported by the UE,
    wherein the random access preamble comprises an information field corresponding to the signaling detection capability supported by the UE.

10. The device of claim 9, wherein the processor is further configured to:
    report the information for identifying a detection capability through a first message in the random access procedure.

11. The device of claim 9, wherein the processor is further configured to:
    report the information for identifying a detection capability through a third message in the random access procedure.

12. The device of claim 9, wherein the processor is further configured to:
    receive a request, sent by the base station through Radio Resource Control (RRC) signaling or a Media Access Control (MAC) control element or physical-layer signaling, for reporting the signaling detection capability supported by the UE.

13. The device of claim 12, wherein the processor is further configured to:
    report the information for identifying a detection capability to the base station on a time-frequency resource specified by the base station through an uplink control channel or an uplink data channel.

14. A device implementing the method of claim 6, comprising:
    a processor; and memory configured to store an instruction executable by the processor to implement operations of the method;

wherein the processor is further configured to:

determine, based on the signaling detection capability of the UE, a detection control parameter configured for the UE; and send detection control signaling to the UE, wherein the detection control signaling contains the detection control parameter;

or, the processor is further configured to:

send, through Radio Resource Control (RRC) signaling or a Media Access Control (MAC) control element or physical-layer signaling, a request for reporting the signaling detection capability to the UE.

15. A communication system implementing the method of claim 1, comprising the UE and the base station, wherein the base station is configured to:

receive the information for identifying the detection capability reported by the UE;

determine the signaling detection capability of the UE based on the information for identifying the detection capability of the UE; and determine, based on the signaling detection capability of the UE, a detection control parameter configured for the UE, to thereby improve success rate and detection efficiency of the UE signaling detection.

\* \* \* \* \*